United States Patent
Torii et al.

(10) Patent No.: US 6,950,106 B2
(45) Date of Patent: Sep. 27, 2005

(54) 3-DIMENSIONAL GRAPHIC PLOTTING APPARATUS

(75) Inventors: Akira Torii, Tokyo (JP); Yoshiyuki Kato, Tokyo (JP); Masatoshi Kameyama, Tokyo (JP); Yoshitsugu Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/476,210

(22) PCT Filed: Mar. 11, 2003

(86) PCT No.: PCT/JP03/02871

§ 371 (c)(1),
(2), (4) Date: Oct. 28, 2003

(87) PCT Pub. No.: WO03/077201

PCT Pub. Date: Sep. 18, 2003

(65) Prior Publication Data

US 2004/0125104 A1 Jul. 1, 2004

(30) Foreign Application Priority Data

Mar. 14, 2002 (JP) ......................................... 2002-070703

(51) Int. Cl.$^7$ ................................................. G06T 1/20
(52) U.S. Cl. ...................... 345/506; 345/427; 345/426; 345/620; 713/506
(58) Field of Search ................................. 345/501–503, 345/505, 506, 426, 427, 418, 519, 620; 713/501, 600

(56) References Cited

U.S. PATENT DOCUMENTS 6,397,343 B1 * 5/2002 Williams et al. ............. 713/501
6,803,916 B2 * 10/2004 Ramani et al. .............. 345/506

FOREIGN PATENT DOCUMENTS

| JP | 6-324666 A | 11/1994 |
| JP | 11-345218 A | 12/1999 |
| JP | 2001-188628 A | 7/2001 |

OTHER PUBLICATIONS

Tömas Moller et al, "Real Time Rendering," A K Peters, Ltd. 1999, pp. 7–21.

* cited by examiner

Primary Examiner—Kee M. Tung
(74) Attorney, Agent, or Firm—Birch, Stewart, Kolasch & Birch, LLP

(57) ABSTRACT

A clock control unit (7) detects completion of data processing based on a busy signal BSY1 output by a geometry processing unit (4) and a busy signal BSY2 output by a rendering processing unit (5). The clock control unit (7) controls supply of a clock signal CLK1 to the geometry processing unit (4) and supply of a clock signal CLK2 to the rendering processing unit (5) so as to cause the geometry processing unit (4) and the rendering processing unit (5) to alternately operate.

9 Claims, 9 Drawing Sheets

CLIPPING PROCESS

3-DIMENSIONAL GRAPHIC PLOTTING APPARATUS

This application is the national phase under 35 U.S.C. § 371 of PCT International Application No. PCT/JP03/02871 which has an International filing date of Mar. 11, 2003, which designated the United States of America.

FIELD OF THE INVENTION

The present invention relates to a three-dimensional graphic drawing apparatus that can reduce power consumption under operating conditions.

BACKGROUND OF THE INVENTION

A process of drawing three-dimensional graphics will be explained first.

FIG. 1 is a flow chart showing a series of processes of drawing three-dimensional graphics. This series of processes can be roughly divide into two processes, i.e., a geometry process (steps ST101 to ST103) and a rendering process (steps ST104 to ST108).

The geometry process is a process of performing a geometry process on each vertex of a polygon that constitutes a three-dimensional scene, and generating vertex data used for drawing a two-dimensional screen, and is subdivided into the following process stages: a coordinate transformation process, a clipping process, and a lighting process. The coordinate transformation process is a process of transforming the coordinates of each vertex that defines a polygon into coordinates in a two-dimensional window coordinate system according to the position and direction of a point of view (step ST101). The lighting process is a process of calculating the brightness of each vertex based on the distance and angle of each vertex from a light source (step ST102). The clipping process is a process of discarding polygons located outside a unit cube corresponding to the screen to be displayed (step ST103).

The rendering process is a process of generating pixel data from the vertex data about the vertices of each polygon, which are generated in the geometry process, and of writing them into a frame buffer, and is subdivided into the following processing stages: a setup process, a rasterizing process, a texture mapping process, a pixel test process, and a pixel blending process. The setup process is a process of calculating parameters, such as an increment required for the rasterizing process, from the vertex data (step ST104). The rasterizing process is a process of performing predetermined interpolation according to the parameters determined in the setup process so as to generate pixel data that are based on polygons (step ST105). The texture mapping process is a process of mapping pixel data about a corresponding texture image onto each pixel data (step ST106). The pixel test process is a process of carrying out a depth test to compare the Z value of each pixel data, which shows the depth of each pixel data, with that of other pixel data, and an alpha test to compare the alpha value of each pixel data with that of other pixel data, and of determining whether to write each pixel data into the frame buffer (step ST107). The pixel blending process is a process of blending a color value of each pixel data, which is determined to be written into the frame buffer in the pixel test process, and a color value that has already been written into the frame buffer, and for writing each pixel data in the frame buffer (step ST108). After the rendering process is completed, a display unit accepts pixel data written into the frame buffer and then produces a screen display.

A well-known technology associated with three-dimensional graphic drawing processing, for speeding up three-dimensional graphic drawing with pipeline processing is disclosed by Tomas Moller and Eric Haines, "Real-Time Rendering" (pp. 7 to 21), for example.

FIG. 2 is a block diagram showing the structure of a prior art three-dimensional graphic drawing apparatus. In the figure, reference numeral 1 denotes the three-dimensional graphic drawing apparatus, reference numeral 2 denotes a host interface that the three-dimensional graphic drawing apparatus 1 uses when performing data transfer with an external host CPU 15, reference numeral 3 denotes a three-dimensional data storing unit for storing data about a three-dimensional scene to be drawn on a screen display, reference numeral 4 denotes a geometry processing unit for performing a geometry process, reference numeral 5 denotes a rendering processing unit for performing a rendering process, reference numeral 6 denotes a frame buffer for storing pixel data, reference numeral 15 denotes the external host CPU connected with the three-dimensional graphic drawing apparatus 1, and reference numeral 16 denotes a display unit connected with the three-dimensional graphic drawing apparatus 1, for displaying an image based on pixel data delivered thereto from the frame buffer 6.

Next, a description will be made as to an operation of the prior art three-dimensional graphic drawing apparatus.

When starting performing a three-dimensional graphic drawing process, data about all polygons that represent a three-dimensional scene are set to the three-dimensional data storing unit 3 under the control of the external host CPU 15 and the geometry processing unit 4 is started. The geometry processing unit 4 reads the data stored in the three-dimensional data storing unit 3, performs a geometry process on the data, and delivers vertex data about the vertices of a polygon, which are a result of the geometry process, to the rendering processing unit 5. The rendering processing unit 5 performs a rendering process on the vertex data delivered thereto from the geometry processing unit 4 so as to generate pixel data, and writes the generated pixel data in the frame buffer 6. The geometry processing unit 4 and the rendering processing unit 5 perform their respective processes in pipelines in such a manner that when the rendering processing unit 5 starts performing a rendering process on a polygon, the geometry processing unit 4 starts performing a geometry process on the next polygon. Furthermore, each of the geometry processing unit 4 and the rendering processing unit 5 performs several processes in pipelines therewithin. When the prior art three-dimensional graphic drawing apparatus completes the process of drawing all polygons that constitute the three-dimensional scene, the prior art three-dimensional graphic drawing apparatus transfers the pixel data written in the frame buffer 6 to the display unit 16 and produces a screen display on the screen of the display unit 16.

A prior art three-dimensional graphic drawing apparatus that is so constructed as to perform a high-speed graphic processing in pipelines, as mentioned above, uses a method of stopping the supply of a clock signal to each processing unit that constitutes the three-dimensional graphic drawing apparatus while the three-dimensional graphic drawing apparatus is not performing a graphic process in order to reduce the power consumption of the three-dimensional graphic drawing apparatus, for example, when the three-dimensional graphic drawing apparatus needs reduction in the power consumption thereof, just as portable equipment needs reduction in the power consumption thereof. A problem with the prior art three-dimensional graphic drawing apparatus is therefore that though the use of this method can reduce the power consumption of the three-dimensional graphic drawing apparatus while the three-dimensional graphic drawing apparatus is not operating, a clock signal is supplied to each of all the processing units that constitute the three-dimensional graphic drawing apparatus while the three-dimensional graphic drawing apparatus is operating, and therefore the power consumption of the three-dimensional graphic drawing apparatus cannot be reduced because even processing units placed in standby state are actually operating.

The present invention is proposed to solve the above-mentioned problem, and it is therefore an object of the present invention to provide a three-dimensional graphic drawing apparatus that can operate with low power consumption by controlling clock signals.

DISCLOSURE OF THE INVENTION

In accordance with the present invention, a three-dimensional graphic drawing apparatus includes a clock control unit for controlling operations of a geometry processing unit and a rendering processing unit by using clock signals respectively supplied to the geometry processing unit and the rendering processing unit.

As a result, the present invention offers an advantage of being able to reduce the power consumption of the three-dimensional graphic drawing apparatus under operating conditions by controlling supply of clocks to all the processing units so that they are not supplied to all the processing units at the same time.

In the three-dimensional graphic drawing apparatus in accordance with the present invention, the geometry processing unit outputs a busy signal while performing a geometry process, the rendering processing unit outputs a busy signal while performing a rendering process, and the clock control unit supplies the clock signals to the geometry processing unit and the rendering processing unit by using the busy signal output by the geometry processing unit and the busy signal output by the rendering processing unit so that the geometry processing unit and the rendering processing unit operate alternately.

As a result, the present invention offers an advantage of being able to reduce the power consumption of the three-dimensional graphic drawing apparatus under operating conditions.

In the three-dimensional graphic drawing apparatus in accordance with the present invention, the geometry processing unit receives three-dimensional data about one polygon, performs a geometry process on the three-dimensional data, and outputs a busy signal, the rendering processing unit includes a setup processing unit for performing a setup process on data about vertices of the one polygon delivered thereto from the geometry processing unit and for outputting a busy signal, and a pixel processing unit for performing a rasterizing process and a pixel process on data delivered thereto from the setup processing unit so as to generate pixel data, and for outputting a busy signal, and the clock control unit supplies clock signals to the geometry processing unit, the setup processing unit and the pixel processing unit based on the busy signal delivered thereto from the geometry processing unit, the busy signal delivered thereto from the setup processing unit, and the busy signal delivered thereto from the pixel processing unit so that the geometry processing unit, the setup processing unit, and the pixel processing unit operate sequentially.

As a result, the present invention offers an advantage of being able to reduce the power consumption of the three-dimensional graphic drawing apparatus under operating conditions.

In the three-dimensional graphic drawing apparatus in accordance with the present invention, the setup processing unit determines whether or not data on which the setup processing unit is performing the setup process are required for drawing and delivers a signal indicating a result of this determination to the clock control unit, and the clock control unit supplies clock signals to the geometry processing unit and the rendering processing unit based on the signal indicating the result of the determination delivered thereto from the setup processing unit so that either the geometry processing unit or the pixel processing unit operates.

As a result, the present invention offers an advantage of being able to reduce the power consumption of the three-dimensional graphic drawing apparatus under operating conditions.

In the three-dimensional graphic drawing apparatus in accordance with the present invention, the geometry processing unit includes a coordinate transformation processing unit for performing a coordinate transformation process on the received three-dimensional data and for outputting a busy signal, a lighting processing unit for performing a lighting process on data delivered thereto from the coordinate transformation processing unit and for outputting a busy signal, and a clipping processing unit for performing a clipping process on data delivered thereto from the lighting processing unit so as to generate vertex data, and for outputting a busy signal, the rendering processing unit outputs a busy signal while performing the rendering process, and the clock control unit supplies clock signals to the coordinate transformation processing unit, the lighting processing unit, the clipping processing unit, and the rendering processing unit based on the busy signal delivered thereto from the coordinate transformation processing unit, the busy signal delivered thereto from the lighting processing unit, the busy signal delivered thereto from the clipping processing unit, and the busy signal delivered thereto from the rendering processing unit so that the coordinate transformation processing unit, the lighting processing unit, the clipping processing unit, and the rendering processing unit operate sequentially.

As a result, the present invention offers an advantage of being able to reduce the power consumption of the three-dimensional graphic drawing apparatus under operating conditions.

In the three-dimensional graphic drawing apparatus in accordance with the present invention, the clipping processing unit determines whether or not a polygon specified by the data delivered thereto is required for drawing and delivers a signal indicating a result of this determination to the clock control unit, and the clock control unit supplies a clock signal to either the rendering processing unit or the coordinate transformation processing unit based on the signal indicating the result of the determination, which is delivered thereto from the clipping processing unit.

As a result, the present invention offers an advantage of being able to reduce the power consumption of the three-dimensional graphic drawing apparatus under operating conditions.

In the three-dimensional graphic drawing apparatus in accordance with the present invention, the clipping processing unit determines whether or not a polygon specified by the data delivered thereto is required for drawing, divides the polygon into a plurality of parts based on a result of the determination, performs the clipping process on the plurality of parts one by one, and delivers a busy signal to the clock control unit until delivering data about all of the plurality of parts into which the polygon is divided to the rendering processing unit, and the clock control unit supplies clock signals to the clipping processing unit and the rendering processing unit based on the busy signal delivered thereto from the clipping processing unit so that the clipping process and the rendering process can be sequentially performed on the plurality of parts into which the polygon is divided.

As a result, the present invention offers an advantage of being able to reduce the power consumption of the three-dimensional graphic drawing apparatus under operating conditions.

In accordance with the present invention, a three-dimensional graphic drawing apparatus includes a clock control unit for supplying clock signals to a geometry processing unit and a rendering processing unit according to an instruction from an external host computer so that the geometry processing unit and the rendering processing unit operate alternately or the geometry processing unit and the rendering processing unit operate in pipelines.

As a result, the present invention offers an advantage of being able to reduce the power consumption of the three-dimensional graphic drawing apparatus under operating conditions, and to increase the processing speed of the three-dimensional graphic drawing apparatus by causing the geometry processing unit and the rendering processing unit to operate in pipelines when making the processing speed a higher priority than the power consumption.

In the three-dimensional graphic drawing apparatus in accordance with the present invention, the geometry processing unit includes a coordinate transformation processing unit for performing a coordinate transformation process on the received three-dimensional data, a lighting processing unit for performing a lighting process on data delivered thereto from the coordinate transformation processing unit, and a clipping processing unit for performing a clipping process on data delivered thereto from the lighting processing unit so as to generate vertex data, and the clock control unit supplies clock signals to the coordinate transformation processing unit, the lighting processing unit, and the clipping processing unit according to an instruction from the external host computer so that the coordinate transformation processing unit, the lighting processing unit, and the clipping processing unit operate sequentially or the coordinate transformation processing unit, the lighting processing unit, and the clipping processing unit operate in pipelines.

As a result, the present invention offers an advantage of being able to reduce the power consumption of the three-dimensional graphic drawing apparatus under operating conditions, and to increase the processing speed of the three-dimensional graphic drawing apparatus by causing the coordinate transformation processing unit, the lighting processing unit, and the clipping processing unit to operate in pipelines when making the processing speed a higher priority than the power consumption.

In the three-dimensional graphic drawing apparatus in accordance with the present invention, the rendering processing unit includes a setup processing unit for performing a setup process on the vertex data delivered thereto from the geometry processing unit, and a pixel processing unit for performing a rasterizing process and a pixel process on data delivered thereto from the setup processing unit so as to generate pixel data, and the clock control unit supplies clock signals to the setup processing unit and the pixel processing unit according to an instruction from the external host computer so that the setup processing unit and the pixel processing unit operate sequentially or the setup processing unit and the pixel processing unit operate in pipelines.

As a result, the present invention offers an advantage of being able to reduce the power consumption of the three-dimensional graphic drawing apparatus under operating conditions, and to increase the processing speed of the three-dimensional graphic drawing apparatus by causing the setup processing unit and the pixel processing unit to operate in pipelines when making the processing speed a higher priority than the power consumption.

PREFERRED EMBODIMENTS OF THE INVENTION

In order to explain the present invention in greater detail, the preferred embodiments will be described below with reference to the accompanying figures.

Embodiment 1.

Figure 1:
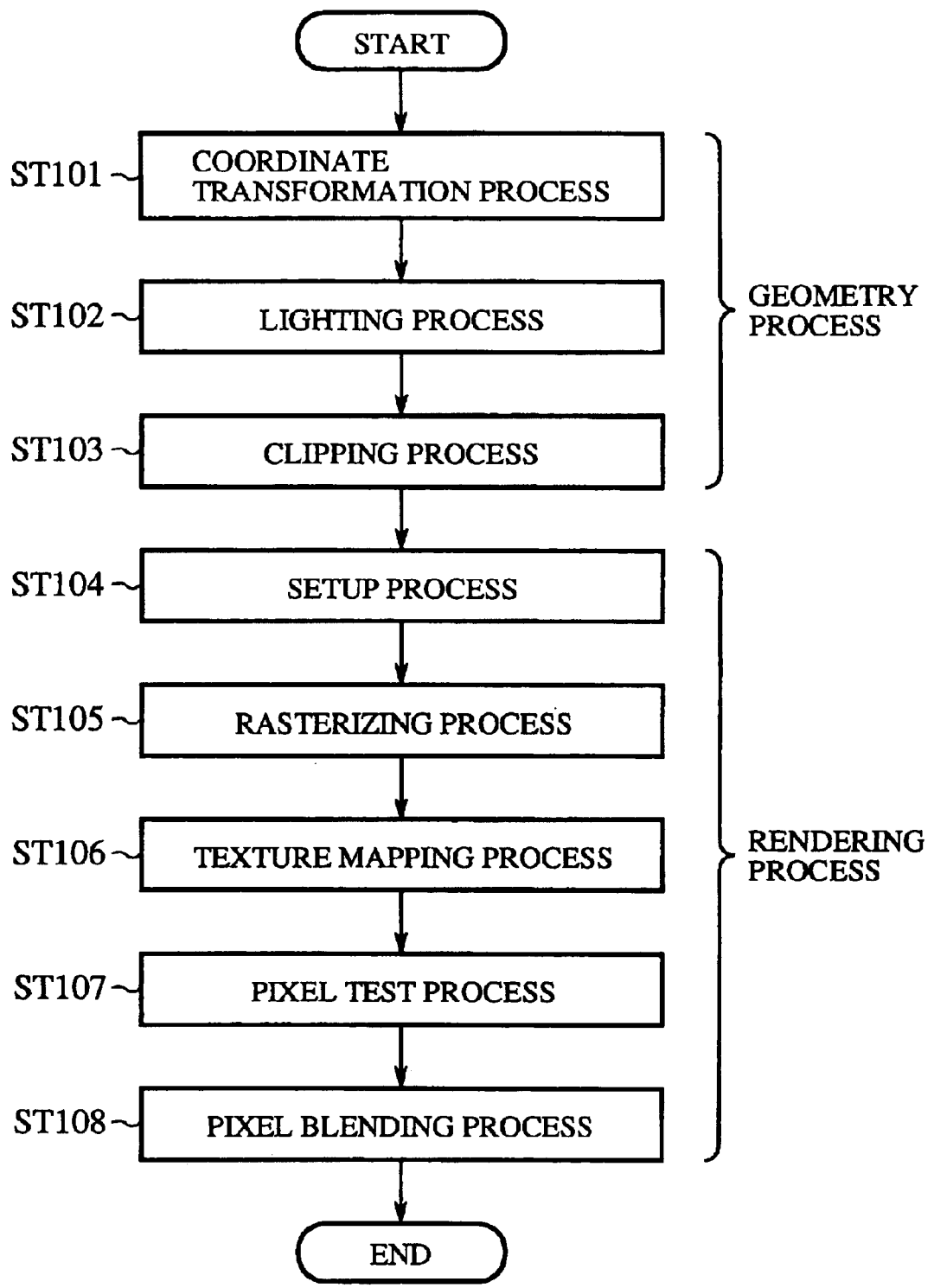
FIG. 1 is a flow chart showing a series of processes of drawing three-dimensional graphics.
Figure 2:
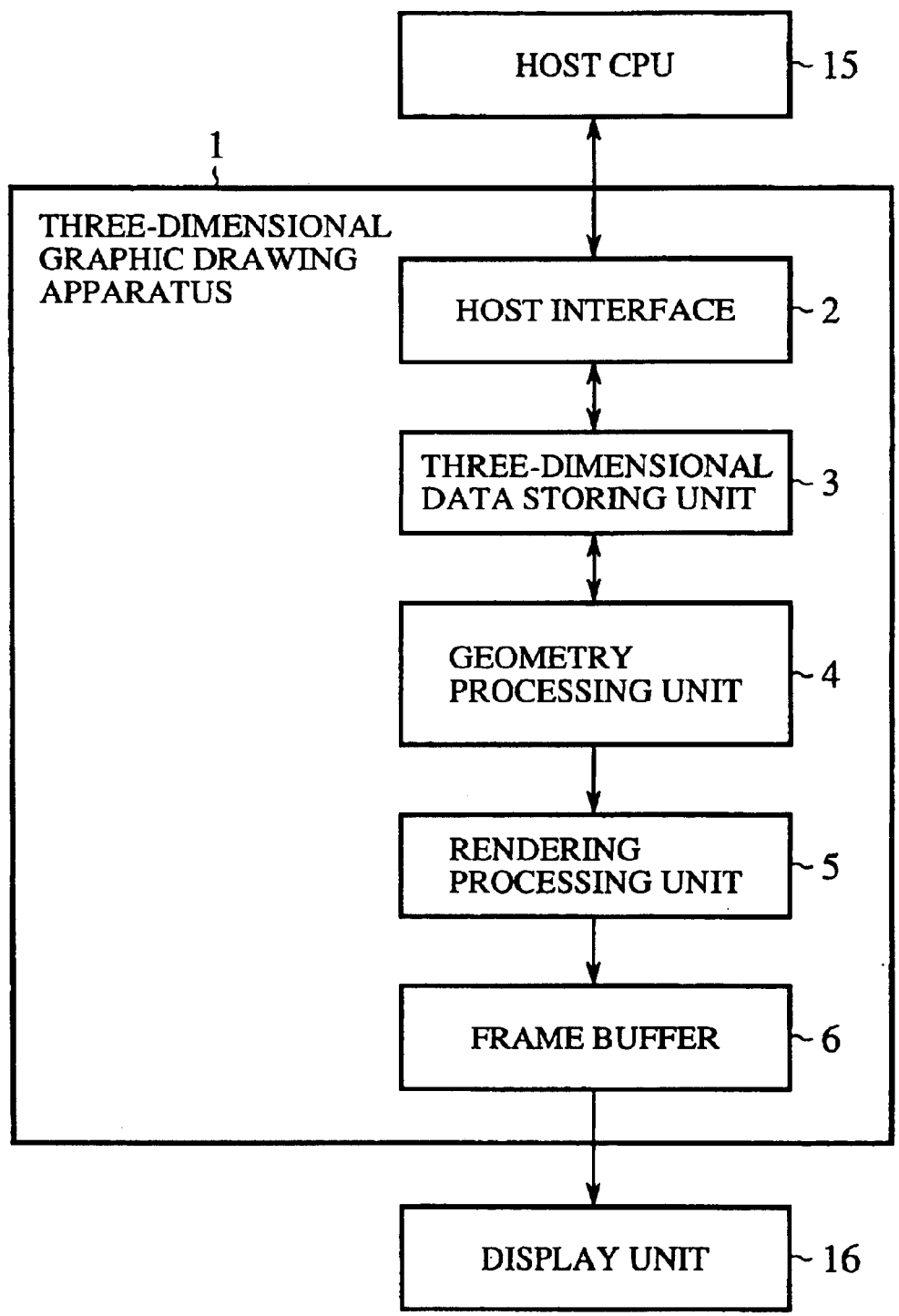
FIG. 2 is a block diagram showing the structure of a prior art three-dimensional graphic drawing apparatus.
Figure 3:
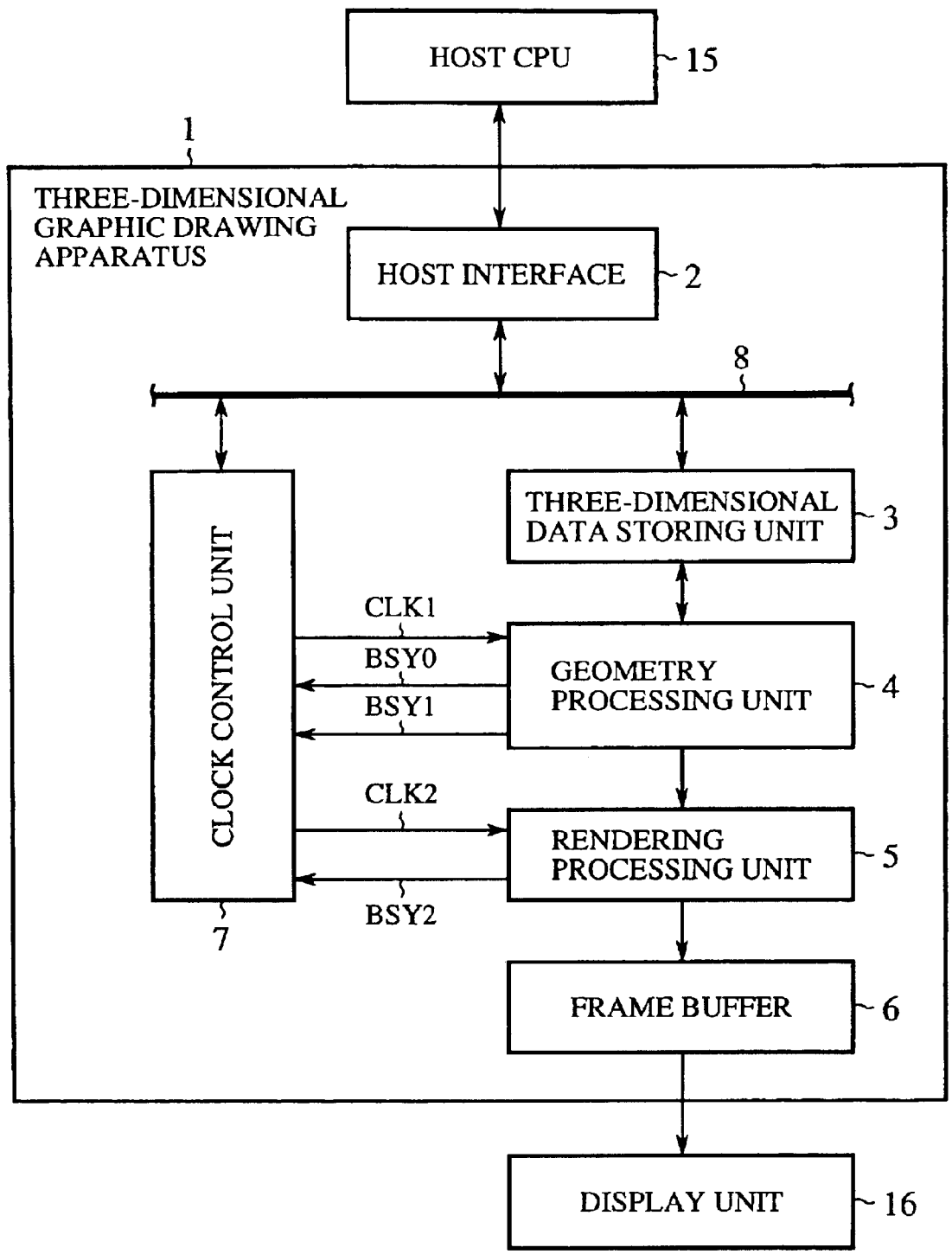
FIG. 3 is a block diagram showing the structure of a three-dimensional graphic drawing apparatus in accordance with embodiment 1 of the present invention.

FIG. 3 is a block diagram showing the structure of a three-dimensional graphic drawing apparatus in accordance with embodiment 1 of the present invention. In the figure, reference numeral 1 denotes the three-dimensional graphic drawing apparatus, reference numeral 2 denotes a host interface that is used when the three-dimensional graphic drawing apparatus 1 performs data transfer with a host CPU (i.e., a host computer) 15 that is located outside the three-dimensional graphic drawing apparatus, reference numeral 3 denotes a three-dimensional data storing unit for storing three-dimensional data, reference numeral 4 denotes a geometry processing unit for reading three-dimensional data from the three-dimensional data storing unit 3, and for performing a geometry process on each vertex of each polygon that constitutes a three-dimensional scene represented by the three-dimensional data so as to generate vertex data required for drawing a two-dimensional screen, reference numeral 5 denotes a rendering processing unit for accepting the vertex data delivered thereto from the geometry processing unit 4, and for generating pixel data from the vertex data, and reference numeral 6 denotes a frame buffer into which the pixel data generated by the rendering processing unit 5 is written.

Reference numeral 7 denotes a clock control unit for supplying clock signals to the geometry processing unit 4 and the rendering processing unit 5, respectively, reference numeral 8 denotes a data bus that is disposed within the three-dimensional graphic drawing apparatus 1 and is used by the host interface 2, the three-dimensional data storing unit 3, and the clock control unit 7 when each of them inputs or outputs data, control signals or the like, reference numeral 15 denotes the host CPU connected with the three-dimensional graphic drawing apparatus 1, and reference numeral 16 denotes a display unit connected with the three-dimensional graphic drawing apparatus 1, for displaying an image based on pixel data delivered thereto from the frame buffer 6.

Furthermore, CLK1 denotes a clock signal which the geometry processing unit 4 accepts, and CLK2 denotes a clock signal which the rendering processing unit 5 accepts. In addition, BSY0 denotes a busy signal indicating that the three-dimensional graphic drawing apparatus 1 is in the middle of carrying out three-dimensional graphic drawing, BSY1 denotes a busy signal indicating that the geometry processing unit 4 is in the middle of carrying out a geometry process, and BSY2 denotes a busy signal indicating that the rendering processing unit 5 is in the middle of carrying out a rendering process.

Next, a description will be made as to an operation of the three-dimensional graphic drawing apparatus 1 in accordance with this embodiment.

Figure 4:
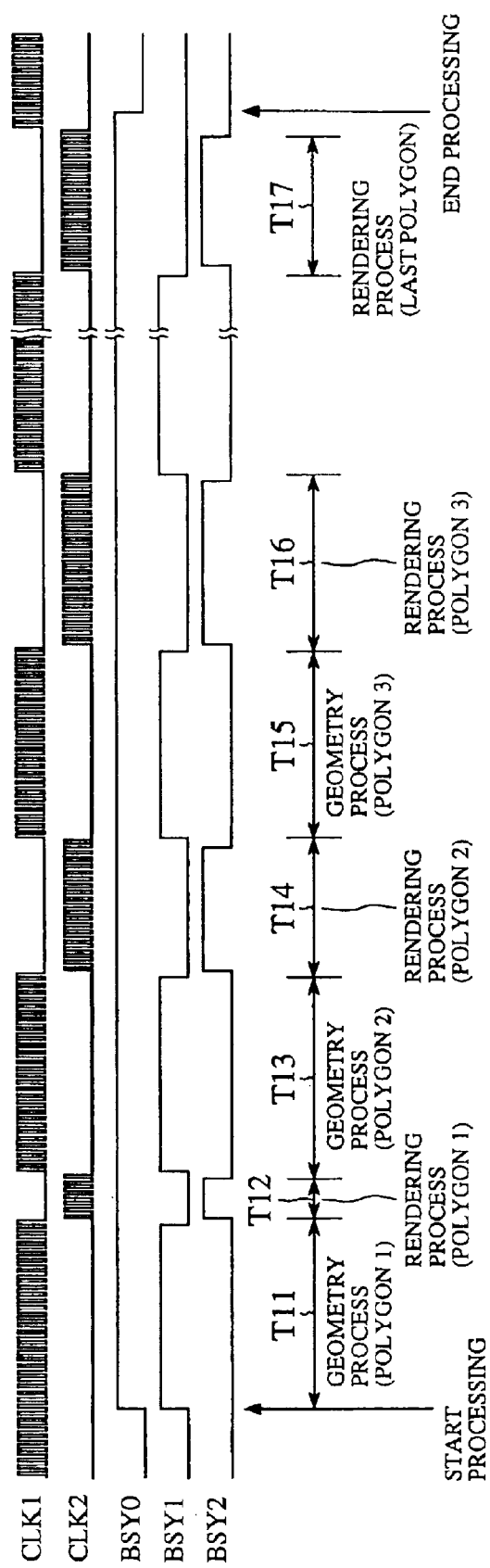
FIG. 4 is an explanatory drawing showing an operation of the three-dimensional graphic drawing apparatus in accordance with embodiment 1.

FIG. 4 is an explanatory drawing showing the operation of the three-dimensional graphic drawing apparatus in accordance with embodiment 1. An operation of each processing unit included in the three-dimensional graphic drawing apparatus 1 will be explained with reference to a timing chart of the clock signals CLK1 and CLK2 and the busy signals BSY0, BSY1, and BSY2, as shown in FIG. 4.

The three-dimensional graphic drawing apparatus 1 is initially placed in a state in which the clock signal CLK1 is supplied from the clock control unit 7 to the geometry processing unit 4, whereas the clock signal CLK2 is not supplied from the clock control unit 7 to the rendering processing unit 5. At that time, all of the busy signals BSY0, BSY1, and BSY2 delivered from the rendering processing unit 5 and the geometry processing unit 4 to the clock control unit 7 have a value of "0", and indicate that neither the geometry processing unit 4 nor the rendering processing unit 5 is operating and that the three-dimensional graphic drawing apparatus 1 is not operating.

When the three-dimensional graphic drawing apparatus 1 starts performing a drawing process, three-dimensional data are set from the host CPU 15 or the like to the three-dimensional data storing unit 3 by way of the data bus 8, and the three-dimensional graphic drawing apparatus 1 causes the clock control unit 7 to supply the clock signal CLK1 to the geometry processing unit 4 so as to start the geometry processing unit 4.

The geometry processing unit 4 that has been started then delivers the busy signals BSY0 and BSY1 having a value of "1" to the clock control unit 7. Furthermore, the geometry processing unit 4 reads data about one polygon from the three-dimensional data storing unit 3. In other words, the geometry processing unit 4 accepts data about polygon 1 and performs a geometry process on the data, delivers vertex data that is a result of the geometry process to the rendering processing unit 5, and causes the busy signal BSY1 to make a transition from "1" to "0" and delivers it to the clock control unit 7.

When the busy signal BSY1 delivered thereto from the geometry processing unit 4 makes a transition from "1" to "0", the clock control unit 7 determines that the geometry processing unit 4 has completed the data processing on the one polygon, stops the supply of the clock signal CLK1 to the geometry processing unit 4, and then starts a supply of the clock signal CLK2 to the rendering processing unit 5. When the supply of the clock signal CLK1 is stopped, the geometry processing unit 4 stops the geometry process while holding the busy signal BSY0 at "1" (at timing T11 as shown in FIG. 4).

The rendering processing unit 5 that has been started in response to the clock signal CLK2 delivers the busy signal BSY2 having a value of "1" to the clock control unit 7. The rendering processing unit 5 then performs a rendering process on the vertex data about the polygon 1 delivered thereto from the geometry processing unit 4, and successively writes pixel data generated in this rendering process into the frame buffer 6. When the rendering processing unit 5 has finished carrying out the rendering process on the polygon 1, the rendering processing unit 5 delivers the busy signal BSY2 having a value of "0" to the clock control unit 7 (at timing T12).

When the busy signal BSY2 makes a transition from "1" to "0", the clock control unit 7 determines that the rendering processing unit 5 has finished performing the rendering process on the one polygon, stops the supply of the clock signal CLK2 to the rendering processing unit 5, and supplies the clock signal CLK1 to the geometry processing unit 4 again. As a result, the geometry processing unit 4 that has restarted operating reads data about the next polygon, i.e., data about polygon 2 from the three-dimensional data storing unit 3, starts carrying out a geometry process on the data about the polygon 2, sets the value of the busy signal BSY1 to "1", and delivers the busy signal BSY1 to the clock control unit 7 (at timing T13).

By sequentially repeating the geometry process by using the geometry processing unit 4, the rendering process by using the rendering processing unit 5, and the writing process of writing pixel data into the frame buffer 6, which are already explained, at timings T13 to T17 as shown in FIG. 4, the three-dimensional graphic drawing apparatus performs all the processes on data on each of the polygon 2, ..., and the last polygon. The three-dimensional graphic drawing apparatus thus processes data about each of all polygons of one frame, which are stored in the three-dimensional data storing unit 3. When completing the data processing on each of all polygons, the geometry processing unit 4 delivers the busy signal BSY0 having a value of "0" to the clock control unit 7. After that, the three-dimensional graphic drawing apparatus delivers pixel data stored in the frame buffer 6 to the display unit 16 when appropriate so as to produce a screen display on the screen of the display unit based on the three-dimensional data.

As mentioned above, in accordance with this embodiment 1, when the geometry processing unit 4 and the rendering processing unit 5 carry out their respective processes, the clock control unit 7 supplies a clock signal CLK1 to the geometry processing unit 4 and supplies a clock signal CLK2 to the rendering processing unit 5 so that the geometry processing unit 4 and the rendering processing unit 5 alternately operate. Therefore, embodiment 1 offers an advantage of being able to reduce the power consumption for three-dimensional graphic drawing processing.

Embodiment 2.

Figure 5:
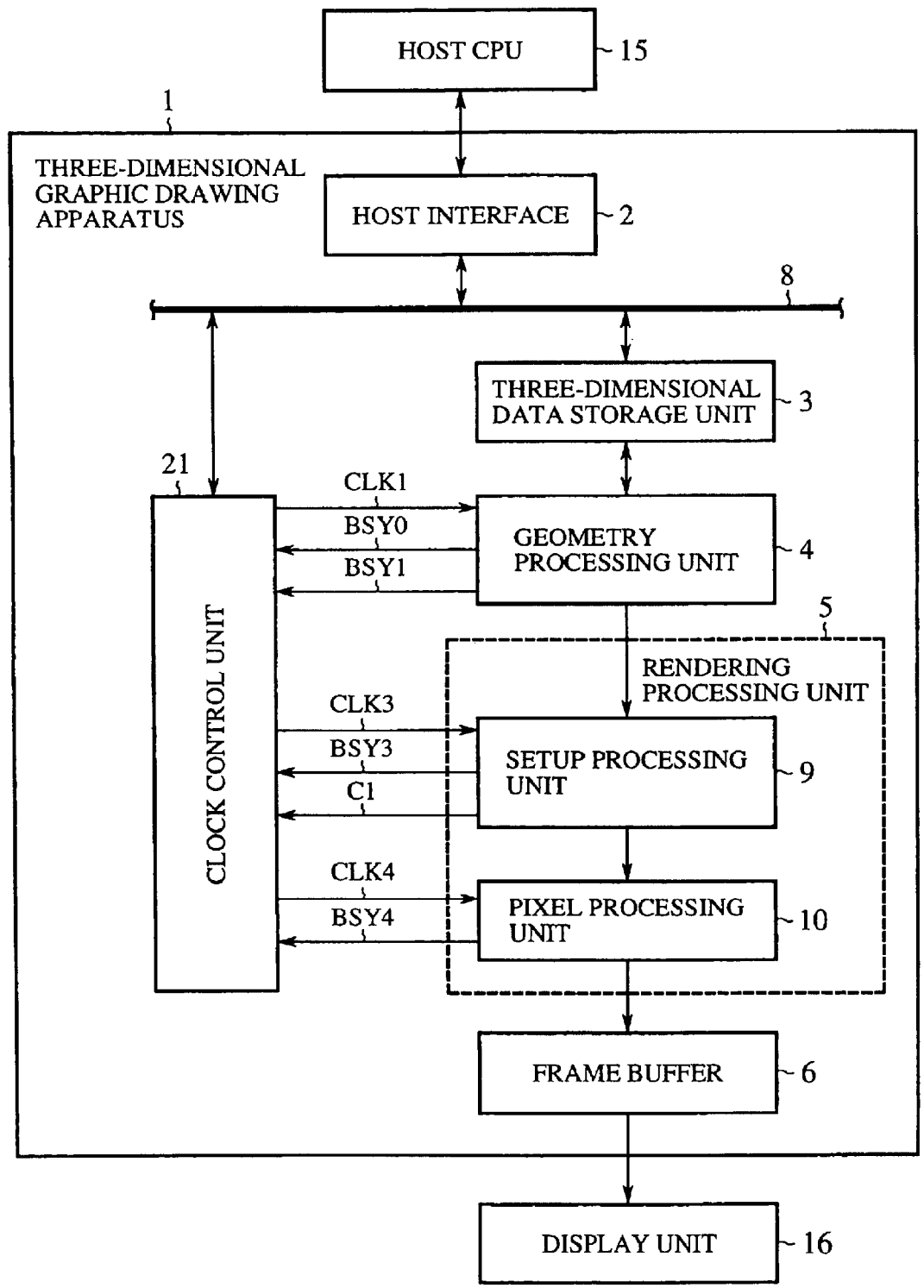
FIG. 5 is a block diagram showing the structure of a three-dimensional graphic drawing apparatus in accordance with embodiment 2 of the present invention.

FIG. 5 is a block diagram showing the structure of a three-dimensional graphic drawing apparatus in accordance with embodiment 2 of the present invention. The same components as those of the three-dimensional graphic drawing apparatus 1 as shown in FIG. 3 or like components are designated by the same reference numerals as shown in FIG. 3, and the explanation of those components will be omitted hereafter. In the figure, reference numeral 9 denotes a setup processing unit for accepting vertex data from a geometry processing unit 4, and for generating parameters, such as an increment required for a rasterizing process; from this vertex data, and reference numeral 10 denotes a pixel processing unit for performing predetermined interpolation according to the parameters generated by the setup processing unit 9, for performing a rasterizing process of generating pixel data that constitutes each polygon, a texture mapping process of mapping pixel data about a texture image onto each pixel data generated in the rasterizing process, a pixel test process of carrying out a depth test to compare the Z value of each pixel data, which shows the depth of each pixel data, with that of other pixel data, and an alpha test to compare the alpha value of each pixel data with that of other pixel data, and of determining whether to write each pixel data into a frame buffer 6, and a pixel blending process of blending a color value that has already been written into the frame buffer 6 and a color value of each pixel data that is determined to be written into the frame buffer 6 in the pixel test process, and for generating pixel data to be written in the frame buffer 6. Reference numeral 21 denotes a clock control unit for controlling supply of clock signals to be applied to the geometry processing unit 4, the setup processing unit 9, and the pixel processing unit 10, respectively. A rendering processing unit 5 of the three-dimensional graphic drawing apparatus 1 in accordance with embodiment 2 is provided with the setup processing unit 9 and the pixel processing unit 10.

Furthermore, CLK1 denotes a clock signal applied to the geometry processing unit 4, CLK3 denotes a clock signal applied to the setup processing unit 9, and CLK4 denotes a clock signal applied to the pixel processing unit 10, those clock signals being output from the clock control unit 21. Furthermore, BSY0 denotes a busy signal indicating that the three-dimensional graphic drawing apparatus 1 is in the middle of drawing three-dimensional graphics, which is delivered from the geometry processing unit 4 to the clock control unit 21, BSY1 denotes a busy signal which is delivered from the geometry processing unit 4 to the clock processing unit 21, BSY3 denotes a busy signal which is delivered from the setup processing unit 9 to the clock control unit 21, and BSY4 denotes a busy signal which is delivered from the pixel processing unit 10 to the clock control unit 21. Those busy signals indicate that the geometry processing unit 4 is operating, the setup processing unit 9 is operating, and the pixel processing unit 10 is operating, respectively. Furthermore, C1 denotes a signal indicating a result obtained by the setup processing unit 9 when determining whether or not data being setup-processed thereby is necessary for drawing. For example, the signal C1 is a drawing cancel signal that has a value of "1" when the setup processing unit determines that data being setup-processed is unnecessary.

Next, a description will be made as to an operation of the three-dimensional graphic drawing apparatus in accordance with this embodiment.

Figure 6:
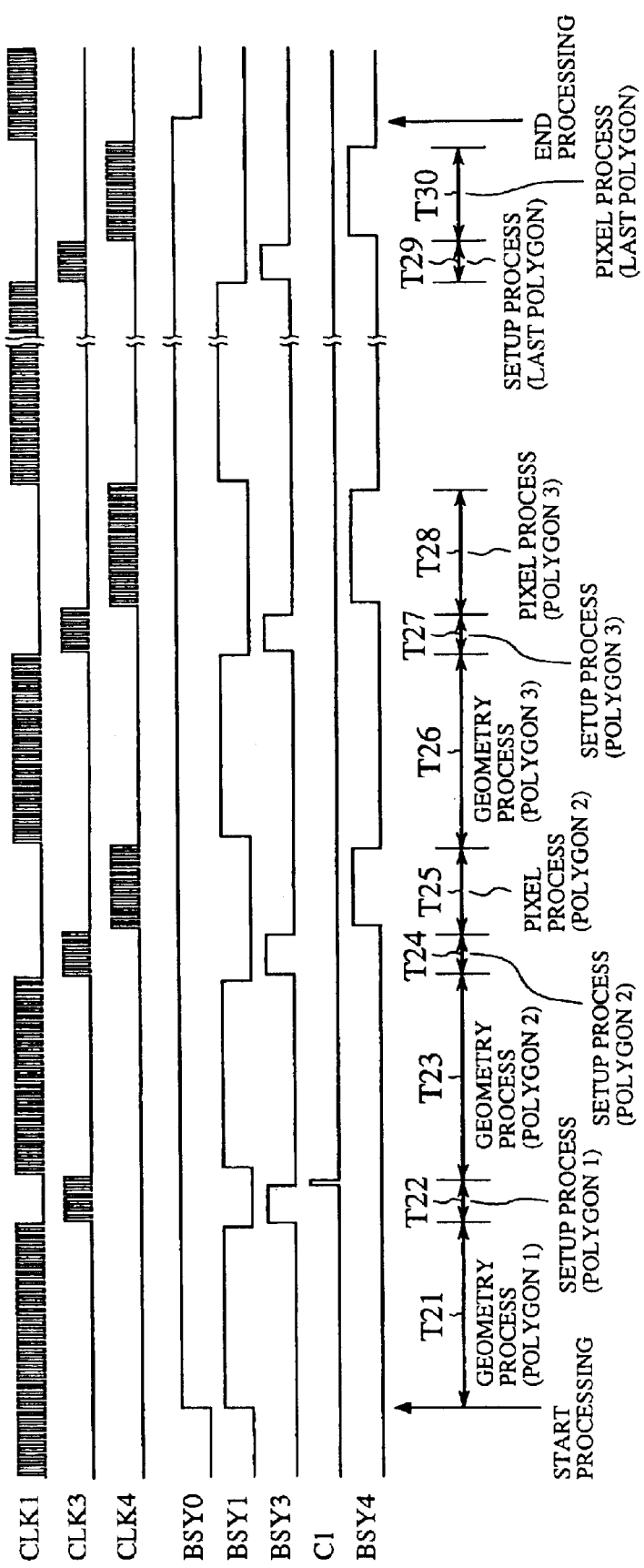
FIG. 6 is an explanatory drawing showing an operation of the three-dimensional graphic drawing apparatus in accordance with embodiment 2.

FIG. 6 is an explanatory drawing showing the operation of the three-dimensional graphic drawing apparatus in accordance with embodiment 2. The function and operation of each component of the three-dimensional graphic drawing apparatus will be explained with reference to the timing chart of the clock signals CLK1, CLK3, and CLK4, and the busy signals BSY0, BSY1, BSY3, and BSY4, as shown in FIG. 6.

The three-dimensional graphic drawing apparatus 1 is initially placed in a state in which the clock control unit 21 supplies the clock signal CLK1 to the geometry processing unit 4, whereas the clock control unit 21 stops the supply of the clock signal CLK3 to the setup processing unit 9 and the supply of the clock signal CLK4 to the pixel processing unit 10. At that time, all the busy signals BSY0, BSY1, BSY3, and BSY4 respectively delivered from the geometry processing unit 4, the setup processing unit 9, and the pixel processing unit 10 have a value of "0", and indicate that these processing units and the three-dimensional graphic drawing apparatus 1 are not operating.

When starting performing a three-dimensional graphic drawing process, an external host CPU 15 or the like sets three-dimensional data to a three-dimensional data storing unit 3, and causes the clock control unit 21 to start a supply of the clock signal CLK1 to the geometry processing unit 4 so as to start the geometry processing unit 4.

The geometry processing unit 4 that has been started then delivers the busy signals BSY0 and BSY1 having a value of "1" to the clock control unit 21. The geometry processing unit 4 then reads data about one 1 polygon, i.e., polygon 1 from the three-dimensional data storing unit 3 and performs a geometry process on the data about the polygon 1. The geometry processing unit 4 delivers vertex data that are a result of the geometry process to the setup processing unit 9, and delivers the busy signal BSY1 having a value of "0" to the clock control unit 21.

When the busy signal BSY1 delivered thereto from the geometry processing unit 4 makes a transition from "1" to "0", the clock control unit 21 determines that the geometry processing unit 4 has completed the data processing on the polygon 1, stops the supply of the clock signal CLK1 to the geometry processing unit 4, and then starts a supply of the clock signal CLK3 to the setup processing unit 9 so as to start the setup processing unit 9. When the supply of the clock signal CLK1 is stopped, the geometry processing unit 4 stops the geometry process while holding the busy signal BSY0 at "1" (at timing T21 as shown in FIG. 6).

The setup processing unit 9 that has been started then delivers the busy signal BSY3 having a value of "1" to the clock control unit and performs a setup process on the vertex data about the polygon 1, which are delivered thereto from the geometry processing unit 4. In this case, the setup processing unit 9 ends the data setup processing when determining that it is not necessary to draw the polygon being processed because the polygon is back facing or determining that the polygon being processed is extremely small and therefore no pixel to be drawn is included in the polygon. The setup processing unit 9 then sets the busy signal BSY3 to "0", as in the case of the setup process on the polygon 1 as shown in FIG. 6, and further sets a drawing cancel signal C1 to "1" and delivers it to the clock control unit 21 (at timing T22). When the setup processing unit 9 thus delivers the drawing cancel signal C1 to the clock control unit 21, the clock control unit 21 supplies the clock signal CLK1 to the geometry processing unit 4 again and performs a geometry process on the next polygon 2 (at timing T23).

Furthermore, when determining that it is necessary to draw the polygon being processed, the setup processing unit 9 continues the setup process, delivers data that is a result of the setup process to the pixel processing unit 10, and sets the value of the busy signal BSY3 to "0". In the processing as illustrated in FIG. 6, after the geometry processing unit 4 performed a geometry process on the polygon 1 at timing T21 and the setup processing unit 9 has performed a setup process on the polygon 1 at timing T22, the setup processing unit 9 determines that it should end the setup process and delivers the drawing cancel signal C1 to the clock control unit. After that, the three-dimensional graphic drawing apparatus starts performing a geometry process on the next polygon 2 at timing T23 without performing a pixel process and so on on the polygon 1.

When the busy signal BSY3 makes a transition from "1" to "0", the clock control unit 21 determines that the setup processing unit 9 has ended its operation, and then stops the supply of the clock signal CLK3 to the setup processing unit 9. At that time, because the three-dimensional graphic drawing apparatus need not perform later processes if the drawing cancel signal C1 is delivered to the clock control unit 21, as shown in FIG. 6, the clock control unit 21 supplies the clock signal CLK1 to the geometry processing unit 4 again. As a result, the geometry processing unit 4 restarts operating and performs a geometry process on data about the next polygon, i.e., the polygon 2 as shown in FIG. 6, and then delivers the busy signal BSY1 having a value of "1" to the clock control unit (at timing T23). After the geometry processing unit 4 performs a geometry process on the polygon 2, the setup processing unit 9 performs a setup process on the vertex data about the polygon 2 (at timing T24). As in the case of performing the setup process on the polygon 2, as shown in FIG. 6, the clock control unit 21 supplies the clock signal CLK4 to the pixel processing unit 10 so as to start the pixel processing unit 10 if no drawing cancel signal C1 is delivered thereto from the setup processing unit 9.

The pixel processing unit 10 that has been started then delivers the busy signal BSY4 having a value of "1" to the clock control unit 21, performs a rasterizing process, a texture process, a pixel test process, and a pixel blending process based on data delivered thereto from the setup processing unit 9, and generates pixel data and successively writes them in the frame buffer 6 (at timing T25). When finishing performing the pixel process, the pixel processing unit 10 delivers the busy signal BSY4 having a "0" to the clock control unit 21. When the busy signal BSY4 makes a transition from "1" to "0", the clock control unit 21 determines that the pixel processing unit 10 has finished performing the pixel process, stops the supply of the clock signal CLK4 to the pixel processing unit 10, and supplies the clock signal CLK1 to the geometry processing unit 4 again. As a result, the geometry processing unit 4, to which the clock signal CLK1 starts being delivered, restarts operating, starts carrying out a geometry process on data about the next polygon 3, sets the value of the busy signal BSY1 to "1", and delivers the busy signal BSY1 having a value of "1" to the clock control unit 21 (at timing T26).

By sequentially repeating the geometry process, the setup process, and the pixel process, which are already explained, at timings T26 to T30, the three-dimensional graphic drawing apparatus performs all the processes on data on each of polygon 3, . . . , and the last polygon. When the three-dimensional graphic drawing apparatus completes the data processing on each of all polygons of one frame which is stored in the three-dimensional data storing unit 3, the geometry processing unit 4 delivers the busy signal BSY0 having a value of "0" to the clock control unit 21. After that, the three-dimensional graphic drawing apparatus reads and delivers pixel data stored in the frame buffer 6 to a display unit 16 when appropriate so as to produce a screen display on the screen of the display unit based on the three-dimensional data.

As mentioned above, in accordance with this embodiment 2, the clock control unit does not deliver clock signals to the geometry processing unit 4, the setup processing unit 9, and the pixel processing unit 10 at the same time so that the geometry processing unit 4, the setup processing unit 9, and the pixel processing unit 10 operate sequentially. As a result, embodiment 2 of the present invention offers an advantage of being able to reduce the power consumption of the three-dimensional graphic drawing apparatus under operating conditions.

Embodiment 3.

Figure 7:
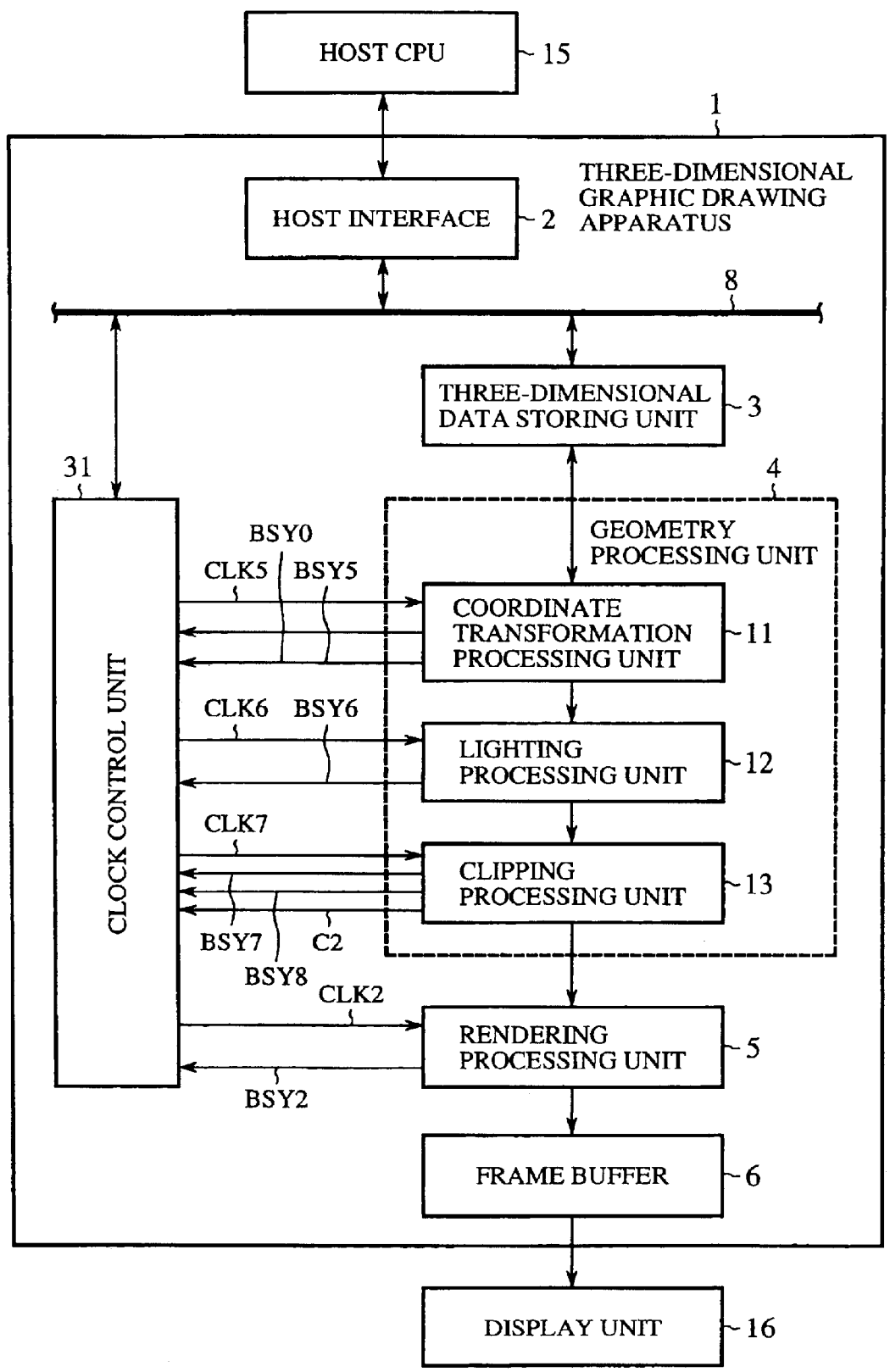
FIG. 7 is a block diagram showing the structure of a three-dimensional graphic drawing apparatus in accordance with embodiment 3 of the present invention.

FIG. 7 is a block diagram showing the structure of a three-dimensional graphic drawing apparatus in accordance with embodiment 3 of the present invention. The same components as those of the three-dimensional graphic drawing apparatus as shown in FIG. 3 or like components are designated by the same reference numerals as shown in FIG. 3, and the explanation of those components will be omitted hereafter. In the figure, reference numeral 11 denotes a coordinate transformation processing unit for reading three-dimensional data from a three-dimensional data storing unit 3, and for transforming the coordinates of each vertex of each of polygons represented by this three-dimensional data into two-dimensional window coordinates according to the position and direction of a point of view, reference numeral 12 denotes a lighting processing unit for calculating the brightness of each vertex of each polygon according to the distance and angle of each vertex from a light source, reference numeral 13 denotes a clipping processing unit for erasing one or more polygons located outside a screen display, and reference numeral 31 denotes a clock control unit for supplying clock signals to the coordinate transformation processing unit 11, the lighting processing unit 12, the clipping processing unit 13, and a rendering processing unit 5, respectively. A geometry processing unit 4 of the three-dimensional graphic drawing measures 1 in accordance with embodiment 3 of the present invention is comprised of the coordinate transformation processing unit 11, the lighting processing unit 12, and the clipping processing unit 13.

Furthermore, CLK5 denotes a clock signal applied to the coordinate transformation processing unit 11, CLK6 denotes a clock signal applied to the lighting processing unit 12, and CLK7 denotes a clock signal applied to the clipping processing unit 13. In addition, BSY0 denotes a busy signal that is output by the coordinate transformation processing unit 11, and that indicates that the three-dimensional graphic drawing apparatus 1 is in the middle of drawing three-dimensional graphics, BSY5 denotes a busy signal indicating that the coordinate transformation processing unit 11 is operating, BSY6 denotes a busy signal indicating that the lighting processing unit 12 is operating, and BSY7 and BSY8 denote busy signals indicating that the clipping processing unit 13 is operating. The busy signal BSY7 is negated when the clipping processing unit 13 completes all of clipping processing, and the busy signal BSY8 is negated every time the clipping processing unit 13 outputs a result of the clipping process performed on each polygon. Furthermore, C2 denotes a signal indicating a result of determination of whether or not each polygon represented by input data is necessary for drawing by the clipping processing unit 13. For example, when determining that each polygon is unnecessary for drawing, the clipping processing unit 13 outputs the drawing cancel signal C2 having a value of "1".

Next, a description will be made as to an operation of the three-dimensional graphic drawing apparatus in accordance with embodiment 3 of the present invention.

Figure 8:
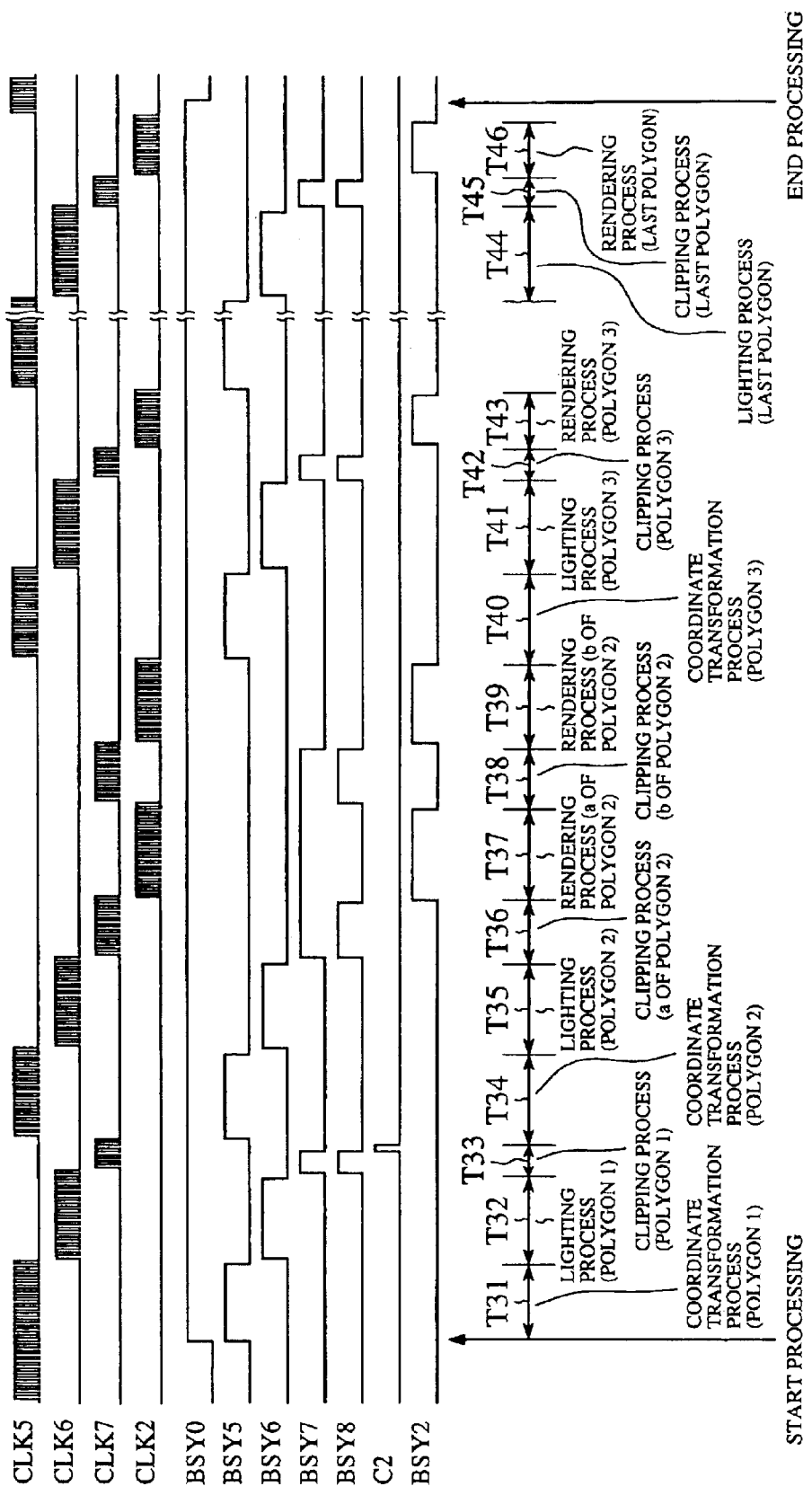
FIG. 8 is an explanatory drawing showing an operation of the three-dimensional graphic drawing apparatus in accordance with embodiment 3.

FIG. 8 is an explanatory drawing showing an operation of the three-dimensional graphic drawing apparatus in accordance with embodiment 3. An operation of each processing unit will be explained with reference to the timing chart, as shown in FIG. 8, of the clock signals CLK5, CLK6, CLK7, and CLK2, the busy signals BSY0, BSY5, BSY6, BSY7, BSY8, and BSY2, and the drawing cancel signal C2.

The three-dimensional graphic drawing apparatus 1 is initially placed in a state in which the clock control unit 31 supplies the clock signal CLK5 to the coordinate transformation processing unit 11, whereas the clock control unit 31 stops the supply of the clock signal CLK6 to the lighting processing unit 12, the supply of the clock signal CLK7 to the clipping processing unit 13, and the supply of the clock signal CLK2 to the rendering processing unit 5. Furthermore, the busy signals BSY0 and BSY5 delivered from the coordinate transformation processing unit 11, the busy signal BSY6 delivered from the lighting processing unit 12, the busy signals BSY7 and BSY8 delivered from the clipping processing unit 13, and the busy signal BSY2 delivered from the rendering processing unit 5 are all at "0" state, and all of them indicate that these processing units are not operating, respectively.

When the three-dimensional graphic drawing apparatus 1 starts performing a drawing process, three-dimensional data are set to the three-dimensional data storing unit 3 by a host CPU 15 or the like and the clock control unit 31 is made to supply the clock signal CLK5 to the coordinate transformation processing unit 11 so as to start the coordinate transformation processing unit 11.

The coordinate transformation processing unit 11 that has started then delivers the busy signals BSY0 and BSY5 having a value of "1" to the clock control unit 31. The coordinate transformation processing unit 11 then reads data about one polygon, i.e., data about polygon 1 from the three-dimensional data storing unit 3, and performs a coordinate transformation process and a clipping process on the data. The coordinate transformation processing unit 11 delivers a result of performing the coordinate transformation process and the clipping process on the data to the lighting processing unit 12, and delivers the busy signal BSY5 having a value of "1" to the clock control unit 31.

When the busy signal BSY5 delivered from the coordinate transformation processing unit 11 makes a transition from "1" to "0", the clock control unit 31 determines that the data processing performed on the polygon 1 has been completed in the coordinate transformation processing unit 11, stops the supply of the clock signal CLK5 to the coordinate transformation processing unit 11, and starts a supply of the clock signal CLK6 to the lighting processing unit 12. When the supply of the clock signal CLK5 is stopped, the coordinate transformation processing unit 11 stops the coordinate transformation process while holding the busy signal BSY0 at state "1" (at timing T31 shown in FIG. 8).

The lighting processing unit 12 that has started in response to the clock signal CLK6 supplied thereto then delivers the busy signal BSY6 having a value of "1" to the clock control unit 31, performs a lighting process on the data about the polygon 1 delivered from the coordinate transformation processing unit 11, delivers vertex data that are a result of performing the lighting process on the data to the clipping processing unit 13, and changes the value of the busy signal BSY6 to "0" and delivers it to the clock control unit 31. When the busy signal BSY6 delivered from the lighting processing unit 12 makes a transition from "1" to "0", the clock control unit 31 determines that the lighting processing unit 12 has completed the data processing, stops the supply of the clock signal CLK6 to the lighting processing unit 12, and starts a supply of the clock signal CLK7 to the clipping processing unit 13 (at timing T32).

The clipping processing unit 13 that has started in response to the clock signal CLK7 delivers the busy signals BSY7 and BSY8 having a value of "1" to the clock control unit 31, and performs a clipping process on the data about the polygon 1 delivered thereto from the lighting processing unit 12 (at timing T33).

Next, the clipping process performed by the clipping processing unit 13 will be explained.

Figure 9:
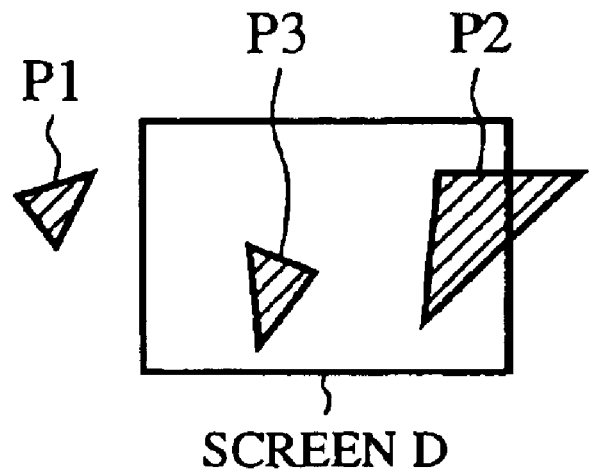
FIG. 9 is an explanatory drawing showing on-screen polygons processed by the three-dimensional graphic drawing apparatus in accordance with embodiment 3.
Figure 9:
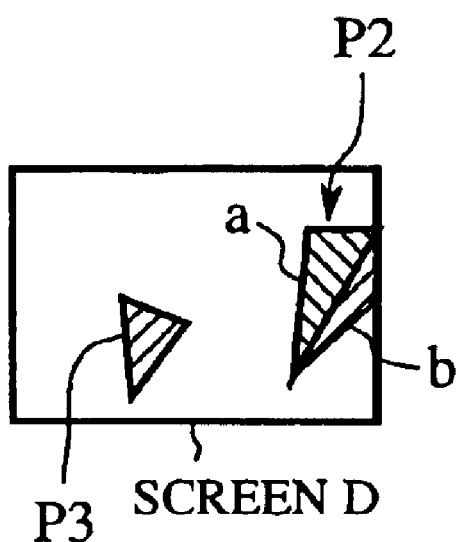

FIG. 9 is an explanatory drawing showing on-screen polygons to be processed by the three-dimensional graphic drawing apparatus in accordance with embodiment 3. In the figure, reference numeral D denotes a screen display represented by three-dimensional data, and P1, P2, and P3 denote polygons, respectively.

The clipping processing unit 13 determines that such a polygon as a polygon P1 located outside the screen display D need not be drawn, and delivers the drawing cancel signal C2 having a value of "1" to the clock control unit 31 as well as the busy signals BSY7 and BSY8 having a value of "0" after causing the three-dimensional graphic drawing apparatus to cancel all later processes to be performed on polygon P1.

When the received busy signals BSY7 and BSY8 make a transition from "1" to "0" and the clock control unit 31 receives the drawing cancel signal C2, the clock control unit 31 stops the supply of the clock signal CLK7 to the clipping processing unit 13 and restarts a supply of the clock signal CLK5 to the coordinate transformation processing unit 11.

Furthermore, the clipping processing unit 13 determines that such a polygon as a polygon P3 located inside the screen display D, as shown in FIG. 9, needs to be drawn, delivers vertex data about each vertex of the polygon P3 to the rendering processing unit 5, and delivers the busy signals BSY7 and BSY8 having a value of "0" to the clock control unit 31.

In contrast, when there is a polygon having a part located outside the screen display D and a small part located inside the screen display D, such as a polygon P2 as shown in FIG. 9, and there is a necessity to divide the internal part of the polygon into a plurality of polygons to be processed, the clipping processing unit 13 erases the external part of the polygon P2 located outside the screen display D, divides the internal part located inside the screen display D into two parts: a and b of the polygon 2, and performs a clipping process and a rendering process on each of them, for example. Processes performed on the polygon 2 at that time will be explained with reference to FIG. 8.

When the received busy signal BSY8 makes a transition from "1" to "0" at timing T33 of FIG. 8, the clock control unit 31 determines that the clipping processing unit 13 has stopped operating, and stops the supply of the clock signal CLK7 to the clipping processing unit 13. At that time, because later processes need not be performed if the drawing cancel signal C2 is delivered from the clipping processing unit 13, the clock control unit 31 supplies the clock signal CLK5 to the coordinate transformation processing unit 11 again.

The coordinate transformation processing unit 11 that has restarted operating starts performing a coordinate transformation process on the next polygon 2 and sets the value of the busy signal BSY5 delivered to clock control unit 31 to "1". After that, as in the case of the polygon 1, the coordinate transformation processing unit 11 performs a coordinate transformation process on the next polygon 2 (at timing T34), the lighting processing unit 12 performs a lighting process on the next polygon 2 (at timing T35), and the clipping processing unit 13 performs a clipping process on the next polygon 2.

Unless the drawing cancel signal C2 is delivered from the clipping processing unit 13, the clock control unit 31 supplies the clock signal CLK2 to the rendering processing unit 5 so as to start the rendering processing unit 5.

In the processing as illustrated in FIG. 8, when the polygon 2 is the one located outside the screen display D, as shown in FIG. 9, the clipping processing unit 13 erases the external part of the polygon 2 located outside the screen display D, divides the internal part of the polygon 2 located inside the screen display D into two parts: a and b of the polygon 2, and performs a clipping process and a rendering process on each of them, for example, thereby increasing the processing speed. The clock control unit 31 receives the busy signals BSY7 and BSY8 having a value of "1" from the clipping processing unit 13 and delivers the clock signal CLK7 to the clipping processing unit at timing T36 of FIG. 8. When the data processing performed on a of the polygon 2 is completed, the clipping processing unit 13 holds the busy signal BSY7 at state "1" and delivers it to the clock control unit 31 because the data processing performed on b of the polygon 2 is not completed, and changes the value of the busy signal BSY8 from "1" to "0" and delivers it to the clock control unit 31 because the clipping process performed on a of the polygon 2 has already been completed.

After that, the clock control unit 31 starts a supply of the clock signal CLK2 to the rendering processing unit 5. The rendering processing unit 5 to which the clock signal CLK2 is supplied delivers the busy signal BSY2 having a value of "1" to the clock control unit 31, and performs a rendering process on data about a of the polygon 2. The rendering processing unit 5, which has performed a rendering process on data about a of the polygon 2 so as to generate pixel data about a of the polygon 2, sets the value of the busy signal BSY2 to "0" and delivers it to the clock control unit 3, and writes the pixel data about a of the polygon 2 in the frame buffer 6 (at timing T37). The clock control unit 31 receives the busy signal BSY2 having a value of "0" and then stops the supply of the clock signal CLK2 to the rendering processing unit. At that time, because the busy signal BSY7 delivered from the clipping processing unit 13 has a value of "1", the clock control unit 31 supplies the clock signal CLK8 to the clipping processing unit 13 again.

The clipping processing unit 13 that has started operating again delivers the busy signal BSY8 having a value of "1" to the clock control unit 31, and performs a clipping process on remaining b of the polygon 2. When the data processing performed on b of the polygon 2 is completed, the clipping processing unit 13 delivers the busy signals BSY7 and BSY8 both having a value of "0" to the clock control unit 31 (at timing T38). After that, data about b of the polygon 2 are applied to the rendering processing unit 5, like the data about a of the polygon 2, and pixel data are generated by the rendering processing unit 5 (at timing T39).

When then writing pixel data about b of the polygon 2 in the frame buffer 6, the rendering processing unit 5 delivers the busy signal BSY2 having a value of "0" to the clock control unit 31. The clock control unit 31 then receives the busy signal BSY2 having a value of "0" and stops the supply of the clock signal CLK2 to the rendering processing unit 5. At that time, the clock control unit 31 starts a supply of the clock signal CLK5 to the coordinate transformation processing unit 11 because the busy signal BSY7 delivered from the clipping processing unit 13 has a value of "0" so as to allow the coordinate transformation processing unit 11 to receive data about the polygon 3 from the three-dimensional data storing unit 3 and start performing a coordinate transformation process on the polygon 3 (at timing T40).

Then, the three-dimensional graphic drawing apparatus repeatedly performs a coordinate transformation process, a lighting process, and a clipping process on data on-each of polygon 3, . . . , and the last polygon at timings T40 to T46 as shown in FIG. 8. When the three-dimensional graphic drawing apparatus completes the data processing on all polygons included in one frame stored in the three-dimensional data storing unit 3, the coordinate transformation processing unit 11 delivers the busy signal BSY0 having a value of "0" to the clock control unit 31 and the three-dimensional graphic drawing processing is then completed.

As mentioned above, in accordance with this embodiment 3, the three-dimensional graphic drawing apparatus controls supply of clock signals to the coordinate transformation processing unit 11, the lighting processing unit 12, the clipping processing unit 13, and the rendering processing unit 5 so as to cause them to operate successively. Therefore, embodiment 3 of the present invention offers an advantage of being able to prevent clock signals from being simultaneously supplied to the coordinate transformation processing unit 11, the lighting processing unit 12, the clipping processing unit 13, and the rendering processing unit 5 and to stop the operations of processing units that don't perform any data processing, thereby reducing the power consumption of the three-dimensional graphic drawing apparatus.

In the three-dimensional graphic drawing apparatus in accordance with embodiment 1, 2 or 3, the clock control unit 7, 21, or 31 can switch between a first operation mode in which the clock control unit sequentially supplies clock signals to all processing units according to an instruction from a host CPU 15 and a second operation mode in which the clock control unit supplies clocks to all processing units so that they operate in pipelines, and can control them by selecting the second operation mode in which the clock control unit supplies clock signals to all processing units so that they operate in pipelines when making the processing speed a higher priority than the power consumption, and selecting the first operation mode in which the clock control unit sequentially supplies clock signals to all processing units so that they operate sequentially with low power consumption when making the power consumption a higher priority than the processing speed.

In accordance with embodiment 1, the three-dimensional graphic drawing apparatus is so constructed as to alternately supply clock signals to the geometry processing unit 4 and the rendering processing unit 5. In accordance with embodiment 2, the three-dimensional graphic drawing apparatus is so constructed as to sequentially supply clock signals to the geometry processing unit 4, the setup processing unit 9, and the pixel processing unit 10. In accordance with embodiment 3, the three-dimensional graphic drawing apparatus is so constructed as to sequentially supply clock signals to the coordinate transformation processing unit 11, the lighting processing unit 12, the clipping processing unit 13, and the rendering processing unit 5. The structure of the three-dimensional graphic drawing apparatus according to the present invention is not limited to any one of the above-mentioned structures. For example, each processing unit is further subdivided into a number of units and an appropriate clock signal is supplied to each of a number of units to which each processing unit is subdivided so that fine control of supply of clock signals to a number of units to which each processing unit is subdivided can be carried out so as to further reduce the power consumption of the three-dimensional graphic drawing apparatus.

INDUSTRIAL APPLICABILITY

As mentioned above, the three-dimensional graphic drawing apparatus in accordance with the present invention is suitable for carrying out three-dimensional graphic drawing with low power consumption in equipment, such as a mobile terminal, that needs a reduction in power consumption.

What is claimed is:

1. A three-dimensional graphic drawing apparatus comprising:

a geometry processing unit for receiving three-dimensional data, and for performing a geometry process on the three-dimensional data so as to generate vertex data;

a rendering processing unit for performing a rendering process on the vertex data generated by said geometry processing unit so as to generate pixel data; and a clock control unit for controlling operations of said geometry processing unit and said rendering processing unit by using clock signals respectively supplied to said geometry processing unit and said rendering processing unit, wherein the geometry processing unit outputs a busy signal while performing the geometry process, the rendering processing unit outputs a busy signal while performing the rendering process, and the clock control unit supplies the clock signals to said geometry processing unit and said rendering processing unit by using the busy signal output by said geometry processing unit and the busy signal output by said rendering processing unit so that said geometry processing unit and said rendering processing unit operate alternately.

2. The three-dimensional graphic drawing apparatus according to claim 1, wherein the geometry processing unit receives three-dimensional data about one polygon, performs a geometry process on the three-dimensional data, and outputs a busy signal, the rendering processing unit includes a setup processing unit for performing a setup process on data about vertices of the one polygon delivered thereto from said geometry processing unit and for outputting a busy signal, and a pixel processing unit for performing a rasterizing process and a pixel process on data delivered thereto from said setup processing unit so as to generate pixel data, and for outputting a busy signal, and the clock control unit supplies clock signals to said geometry processing unit, said setup processing unit and said pixel processing unit based on the busy signal delivered thereto from said geometry processing unit, the busy signal delivered thereto from said setup processing unit, and the busy signal delivered thereto from said pixel processing unit so that said geometry processing unit, said setup processing unit, and said pixel processing unit operate sequentially.

3. The three-dimensional graphic drawing apparatus according to claim 2, wherein the setup processing unit determines whether or not data on which said setup processing unit is performing the setup process are required for drawing and delivers a signal indicating a result of this determination to the clock control unit, and the clock control unit supplies clock signals to the geometry processing unit and the rendering processing unit based on the signal indicating the result of the determination delivered thereto from said setup processing unit so that either said geometry processing unit or the pixel processing unit operates.

4. The three-dimensional graphic drawing apparatus according to claim 1, wherein the geometry processing unit includes a coordinate transformation processing unit for performing a coordinate transformation process on the received three-dimensional data and for outputting a busy signal, a lighting processing unit for performing a lighting process on data delivered thereto from said coordinate transformation processing unit and for outputting a busy signal, and a clipping processing unit for performing a clipping process on data delivered thereto from said lighting processing unit so as to generate vertex data, and for outputting a busy signal, the rendering processing unit outputs a busy signal while performing the rendering process, and the clock control unit supplies clock signals to said coordinate transformation processing unit, said lighting processing unit, said clipping processing unit, and said rendering processing unit based on the busy signal delivered thereto from said coordinate transformation processing unit, the busy signal delivered thereto from said lighting processing unit, the busy signal delivered thereto from said clipping processing unit, and the busy signal delivered thereto from said rendering processing unit so that said coordinate transformation processing unit, said lighting processing unit, said clipping processing unit, and said rendering processing unit operate sequentially.

5. The three-dimensional graphic drawing apparatus according to claim 4, wherein the clipping processing unit determines whether or not a polygon specified by the data delivered thereto is required for drawing and delivers a signal indicating a result of this determination to the clock control unit, and the clock control unit supplies a clock signal to either the rendering processing unit or the coordinate transformation processing unit based on the signal indicating the result of the determination, which is delivered thereto from said clipping processing unit.

6. The three-dimensional graphic drawing apparatus according to claim 4, wherein the clipping processing unit determines whether or not a polygon specified by the data delivered thereto is required for drawing, divides said polygon into a plurality of parts based on a result of the determination, performs the clipping process on the plurality of parts one by one, and delivers a busy signal to the clock control unit until delivering data about all of the plurality of parts into which said polygon is divided to the rendering processing unit, and said clock control unit supplies clock signals to said clipping processing unit and said rendering processing unit based on the busy signal delivered thereto from said clipping processing unit so that the clipping process and the rendering process can be sequentially performed on the plurality of parts into which said polygon is divided.

7. A three-dimensional graphic drawing apparatus comprising:

a geometry processing unit for receiving three-dimensional data, and for performing a geometry process on the three-dimensional data so as to generate vertex data;

a rendering processing unit for performing a rendering process on the vertex data generated by said geometry processing unit so as to generate pixel data, said apparatus being connected with an external host computer; and a clock control unit for supplying clock signals to said geometry processing unit and said rendering processing unit according to an instruction from said external host computer so that said geometry processing unit and said rendering processing unit operate alternately in a first operating mode and so that said geometry processing unit and said rendering processing unit operate in pipelines in a second operating mode, wherein the geometry processing unit outputs a busy signal while performing the geometry process, the rendering processing unit outputs a busy signal while performing the rendering process, and the clock control unit supplies the clock signals to said geometry processing unit and said rendering processing unit by using the busy signal output by said geometry processing unit and the busy signal output by said rendering processing unit so that said geometry processing unit and said rendering processing unit operate alternately.

8. The three-dimensional graphic drawing apparatus according to claim 7, wherein the geometry processing unit includes a coordinate transformation processing unit for performing a coordinate transformation process on the received three-dimensional data, a lighting processing unit for performing a lighting process on data delivered thereto from said coordinate transformation processing unit, and a clipping processing unit for performing a clipping process on data delivered thereto from said lighting processing unit so as to generate vertex data, and the clock control unit supplies clock signals to said coordinate transformation processing unit, said lighting processing unit, and said clipping processing unit according to an instruction from said external host computer so that said coordinate transformation processing unit, said lighting processing unit, and said clipping processing unit operate sequentially in said first operating mode and so that said coordinate transformation processing unit, said lighting processing unit, and said clipping processing unit operate in pipelines in said second operating mode.

9. The three-dimensional graphic drawing apparatus according to claim 7, wherein the rendering processing unit includes a setup processing unit for performing a setup process on the vertex data delivered thereto from said geometry processing unit, and a pixel processing unit for performing a rasterizing process and a pixel process on data delivered thereto from said setup processing unit so as to generate pixel data, and the clock control unit supplies clock signals to said setup processing unit and said pixel processing unit according to an instruction from said external host computer so that said setup processing unit and said pixel processing unit operate sequentially in said first operating mode and so that said setup processing unit and said pixel processing unit operate in pipelines in said second operating mode.

* * * * *